United States Patent [19]

Braun

[11] Patent Number: 5,544,619
[45] Date of Patent: Aug. 13, 1996

[54] COLLAPSIBLE CAGE

[75] Inventor: Hans Braun, Ludwigsburg, Germany

[73] Assignee: Wagner & Keller GmbH & Co., Ludwigsburg, Germany

[21] Appl. No.: 307,289

[22] Filed: Sep. 16, 1994

[30] Foreign Application Priority Data

Sep. 16, 1993 [DE] Germany ............................ 9314021 U

[51] Int. Cl.⁶ ..................................................... A01K 1/03
[52] U.S. Cl. ........................... 119/474; 446/114; 119/461
[58] Field of Search ...................... 119/17, 19; 446/108, 446/111, 112, 114, 115

[56] References Cited

U.S. PATENT DOCUMENTS

| 3,659,376 | 5/1972 | Fischer | 446/112 |
| 4,762,085 | 8/1988 | Ondrasik | 119/17 |
| 4,819,582 | 4/1989 | Lichvar | 119/17 |
| 5,322,466 | 6/1994 | Bolli et al. | 446/111 |

FOREIGN PATENT DOCUMENTS

2291701  6/1976  France.
3007920A1  9/1981  Germany.
32121750A1  10/1983  Germany.

*Primary Examiner*—Todd E. Manahan
*Attorney, Agent, or Firm*—Jones, Tullar & Cooper, P.C.

[57] ABSTRACT

In order to permit a purchaser to assemble a collapsible cage simply and without the need for special tools, the side walls (2 to 5), which are usually four in number, are connected to each other by sectional corner connectors (7 to 10). The sectional corner connectors are longitudinally divided into two parts and consist of an outer part (16) and an inner part (17). Both parts are undetachably connected via rotating parts (22). In one variant, spreader springs (35, 36) ensure that the parts (16, 17) of the sectional corner connectors are held apart in the untightened state so that the widest possible gap (33) is created for inserting the edge zones (19, 20) of the gratings. When the rotating parts (22) are rotated, for example through about 90°, this causes the inner part (17) of the sectional corner connector to move towards the outer part, while at the same time clamping the edge zones (19, 20) of the gratings.

34 Claims, 8 Drawing Sheets

COLLAPSIBLE CAGE

FIELD OF THE INVENTION

The present invention relates to a collapsible cage consisting of a tray in which the lower ends of side walls engage, and also preferably having a lid; the side walls are arranged at right angles to each other and are joined together by sectional corner connectors forming the corners of the cage, and also each wall is preferably made of a wire grating.

BACKGROUND OF THE INVENTION

Cages, especially large cages for large birds, rabbits or a large number of smaller animals take up a relatively large amount of space in storage and during transport. In order to save on storage space or to obtain smaller shipping units, it has already been proposed that cages should be designed as collapsible structures, so that in the collapsed state they take up only a fraction, for example only one quarter to one fifth, of the space required by the fully assembled cage.

The purchaser of a cage normally acquires the cage in the collapsed state so that he, too, has only a small unit to transport. On the other hand, however, he has to assemble the cage once he gets it home. It must be possible to do this without the need for any special technical skills or tools. For this reason, it has been suggested that, for example in the case of a box-shaped cage having four lateral corners, each corner should be formed by a sectional corner connector into which adjacent lateral edges, which are vertical when in use, or outer edge zones of the wire gratings, are longitudinally inserted. The sectional corner connector is provided with a groove for each of the two lateral edge zones of the wire gratings. However, these grooves must be designed and adapted to the lateral edge zones of the wire gratings in such a way that these latter cannot be pulled out of the grooves in the horizontal direction. It must be remembered here that the lateral edge zone of the wire gratings may consist of at least one vertical grating bar and a plurality of horizontal grating bars welded to it. In the known type of collapsible cage, it is precisely this design of the two edge zones that makes it very difficult, and requires the application of force, to insert the two walls into the sectional corner connectors. It would be possible to make the grooves, wider, but this would have the disadvantage that the cage would then lose its stability. This method of assembly is inherently unsuitable for the layman.

SUMMARY OF THE INVENTION

It is therefore the task of the present invention to refine the design of a collapsible cage of the type described above in such a way that the inherently advantageous sectional corner connectors can be retained, but the edge zones of the side walls, and in particular the edge zones of the gratings, are easier to connect without the assembled cage losing any rigidity.

In order to solve this problem, the present invention proposes that the collapsible cage be designed with sectional corner connectors divided longitudinally into two parts, both parts being tightenable against each other by means of at least two clamping devices while holding between them parallel edge zones of adjacent side walls. After they have been tightened together, the two parts of the sectional corner connectors can be moved apart again from the wall edge zones by means of at least one spreader device. Because, in this case, the sectional corner connectors are designed in two parts, the two edge zones of the adjacent wire gratings can be inserted without difficulty into their mounting groove in the sectional corner connector, without any need to use force. For this operation, it is very advantageous that the two parts of the sectional corner connector can be moved apart by means of a spreader device so that when the clamping devices are opened to their fullest extent, the maximum width of the mounting groove is also available for inserting the edge zones of the wire gratings, without the need for any special manipulations or tools. In this way, the side walls of the cage can be connected to each other, but the rigidity and stability needed when the cage is in use are still lacking. However, these qualities can be achieved in a simple way by closing or tightening the clamping devices with the aid of which the two parts of the sectional corner connector can be tightened against each other, at the same time gripping the edge zones of the side walls which are inserted in them. The unit formed in this way out of normally four side walls and the sectional corner connectors is then placed in the tray, with which it can then be joined in a known manner. In addition, a lid or roof may be attached.

Small animals require not only a smaller cage, but in their case it is also sufficient to use gratings with thinner bars. The clamping devices can be designed in such a way that they are capable of gripping gratings made of wire of different gauge. Furthermore, the number of clamps used per sectional corner connector depends of course on the length of the connector. Thus, the sectional corner connectors are very universal in their application and sections of the desired length can be cut from longer stock. Advantageously these connectors are made of plastic.

According to a further refinement of the present invention, the two parts of the sectional corner connector and the clamping devices are undetachably joined. Together they form an assembly unit. The parts of this assembly unit are of course held together by means of the clamping devices, which however, because of the action of the spreader springs, are in the maximally open position before the assembly unit is connected to the side walls. Various means are known by which two parts, i.e. in this specific case the two parts of the clamping device, can be undetachably connected, for example a snap-type or latch-type engagement may be used.

A further embodiment of the present invention is characterized by the fact that each spreader device is formed by at least one spreader spring and the parts of the sectional corner connector can be pressed against the edge zones of the side walls by overcoming the resistance of at least one such spring. When the side walls are clamped in place the spreader springs are tensioned or, if they are already pre-tensioned, they are further tensioned. When, at a later time, the clamping devices are released in order to disassemble the cage, the spreader springs force the two parts of the sectional corner connector apart and the side walls can then be easily removed from the gap between the two parts of the connector.

Another embodiment of the present invention is characterized in that the spreader springs are manufactured integrally with the associated part of the sectional corner connector and take the form of pivotable tongues. A wide range of possibilities for integral manufacture exist when the items are made from plastic, and this reduces the amount of work required to assemble the cage. Furthermore, the spreader springs can be integrally formed onto the two parts of the sectional corner connector. It is merely necessary to ensure that once the two parts of the clamp have been joined together these springs can develop their force and push the two parts of the sectional corner connector apart.

According to a first variant of the design the back of a curved spreader spring projects in the unloaded state beyond the plane of a connector and is elastically compressible into a recess in one part of the sectional corner connector. The back of the curved spring projects far enough that when the two parts of the clamping device have been joined together, it is compressed by the other part of the sectional corner connector and thus generates its spreading force.

According to another variant of the design of the spreader spring the spreader spring is located in a recess of an inner part of the sectional corner connector and an actuating pin pointing in the clamping direction is formed onto the outer part of the sectional corner connector. This variant offers advantages when the part of the sectional corner connector on which the spreader springs are mounted is made of plastic.

According to a particularly advantageous embodiment of the present invention the inner part, when in use, of the sectional corner connector has an approximately trapezoidal cross section and the outer part of the sectional corner connector possesses a substantially C-shaped cross section. The dimensioning of the cross sections has been selected in such a way that the free C-shaped ends of the section legs point towards the two trapezoidal surfaces of the inner part of the sectional corner connector so that the edge zone, and in particular the horizontal bars, of the grating walls can be clamped in the gap between the two parts. The sectional profile of the connector can be selected such that, in the case referred to, only the horizontal bars, but not the vertical bar at the outer edge of the grating, are clamped. This then opens up the possibility of using wire of different gauge for this latter bar, so that in relative terms a wider choice of wire gauges is available.

Advantageously, the middle zone of the C-cross section is internally reinforced, the cross section of the reinforcement being approximately trapezoidal. The smaller parallel faces of the two trapezoidal zones are arranged opposite each other. In particular, care is taken to ensure that even when the clamping devices are tensioned to their maximum extent, the two small parallel trapezoidal faces are not in contact with each other. This allows the clamping devices to be continuously tensioned up to the maximum limit.

According to a further refinement of the present invention each clamping device consists of a rotating part possessing a shaft as well as a head and having at least one radially projecting cam at the free end of the shaft as well as a spiral-shaped ramp surface provided for each cam on the inner part of the sectional corner connector and pointing away from the outer part of the sectional corner connector. The cams engage behind the ramp surface. According to this embodiment, the clamping device, prior to being undetachably connected, possesses only one loose part, namely the rotating part with a head and at least one radially projecting cam. The other part of each clamping device is located on the inner part of the sectional corner connector and is thus very advantageously manufactured integrally together with the connector, thereby reducing the number of parts and the costs. When a cam engages behind the sliding surface, this establishes the aforementioned undetachable connection between the clamping devices and the respective sectional corner connector, or in this case between the rotating part and the sectional corner connector. A particularly preferred further embodiment of the clamping device is one where the shaft of the rotating part of the clamping device is of circular cross section and is provided at its free end with two radially projecting cams offset by 186°, which are tapered in the direction of insertion. The insertion slots provided for the cams in the inner part of the sectional corner connector are tapered in the same way so that when the cams are pressed into position while overcoming elastic resistance, they engage like barbs behind the insertion slots. The rotating part is inserted through a borehole in the outer part of the sectional corner connector, which must possess an opening large enough to permit not only the shaft but also the cam projecting radially from the free end of this shaft to pass through unhindered. When, however, the latter cam reaches the insertion slot in the inner part of the sectional corner connector, the rotating part can only be further inserted by overcoming an engaging force, and for this the connector must yield elastically in this area. The latching engagement can be accomplished in a simple manner by pushing the rotating part into position while the inner part of the sectional corner connector is warm enough, and thus yielding enough, to permit it to happen. Once it has engaged, the rotating part can no longer be pulled out without the risk of causing damage, and thus all the rotating parts are undetachably connected, as desired, with the inner part of the sectional corner connector while the outer part of the sectional corner connector is also interposed and held in place by the heads of the rotating parts.

Each spiral-shaped ramp surface merges gradually and very advantageously into the supporting surface for the engaged cam. When, therefore, the two lateral edge zones of the wire gratings have been inserted into the two mounting slots of the sectional corner connector, which preferably enclose an angle of 90°, rotation of each rotating part automatically causes its cam or cams to ride up on the associated spiral-shaped ramp surface and, as a result, the inner part of the sectional corner connector is moved towards the outer part of the connector while at the same time clamping the two edge zones of the side walls which are at right angles to each other.

Advantageously, the head of each rotating part is recessed at least partially in the outer part of the sectional corner connector, in that the head of the rotating part fits at least partially into a recess on the outer surface of the outer part of the sectional corner connector.

Because any layman, including also for example any child, should be able to assemble this cage, it is necessary to ensure that no special tools are required for the assembly. This goal can be achieved by further refining the design of the rotating part in that the cams are mounted inside the inner part of the sectional corner connector. A coin, with the aid of which the rotating part can be rotated for example through an angle of 90°, is always available and thus anybody can carry out the assembly of the cage. Instead of a simple slot, a (Phillips type) cross slot may also be provided. The depth of the slot should be chosen to ensure that the necessary force can be exerted by the coin without tearing the slot.

Another very advantageous variant of the present invention is derived from FIGS. 14 to 23. While in the embodiment described above the spreader device, which when released forces the outer and inner parts of the sectional corner connector apart, is formed by in each case a spreader spring, in the embodiment shown in FIGS. 14 et seq., the spreading action is brought about by a spreader device which does not require spring force but instead relies on the spreading action produced by rotating the rotating part. Consequently, in this case, the rotating part has a double function to fulfil, namely on the one hand to form part of the clamping device and on the other to form part of the spreader device. Spreading of the parts of the connector is accomplished by turning the rotating part in exactly the opposite direction to that needed for clamping. This positive spreading action is achieved with total reliability, whereas it is no longer guaranteed when a spreader spring is used because the spring may be weak or broken. Nevertheless, the technical effort required to produce the variant depicted in FIGS. 14 et seq. is no greater than in the other embodiments.

The special design of this springless construction is dealt with in the following description of the respective embodiment; it must be explicitly pointed out that all the explanations given in this regard are essential to the present invention. In addition, this variant can be combined in any way desired either individually or severally.

Further design variants of this collapsible cage may be derived from the sub-claims as well as from the following description of the embodiments.

BRIEF DESCRIPTION OF THE DRAWINGS

The drawing shows these embodiments of the present invention. The figures show:

FIGS. 21 to 23 are drawn on a slightly smaller scale than FIGS. 14 to 20.

DETAILED DESCRIPTION

Figure 1:
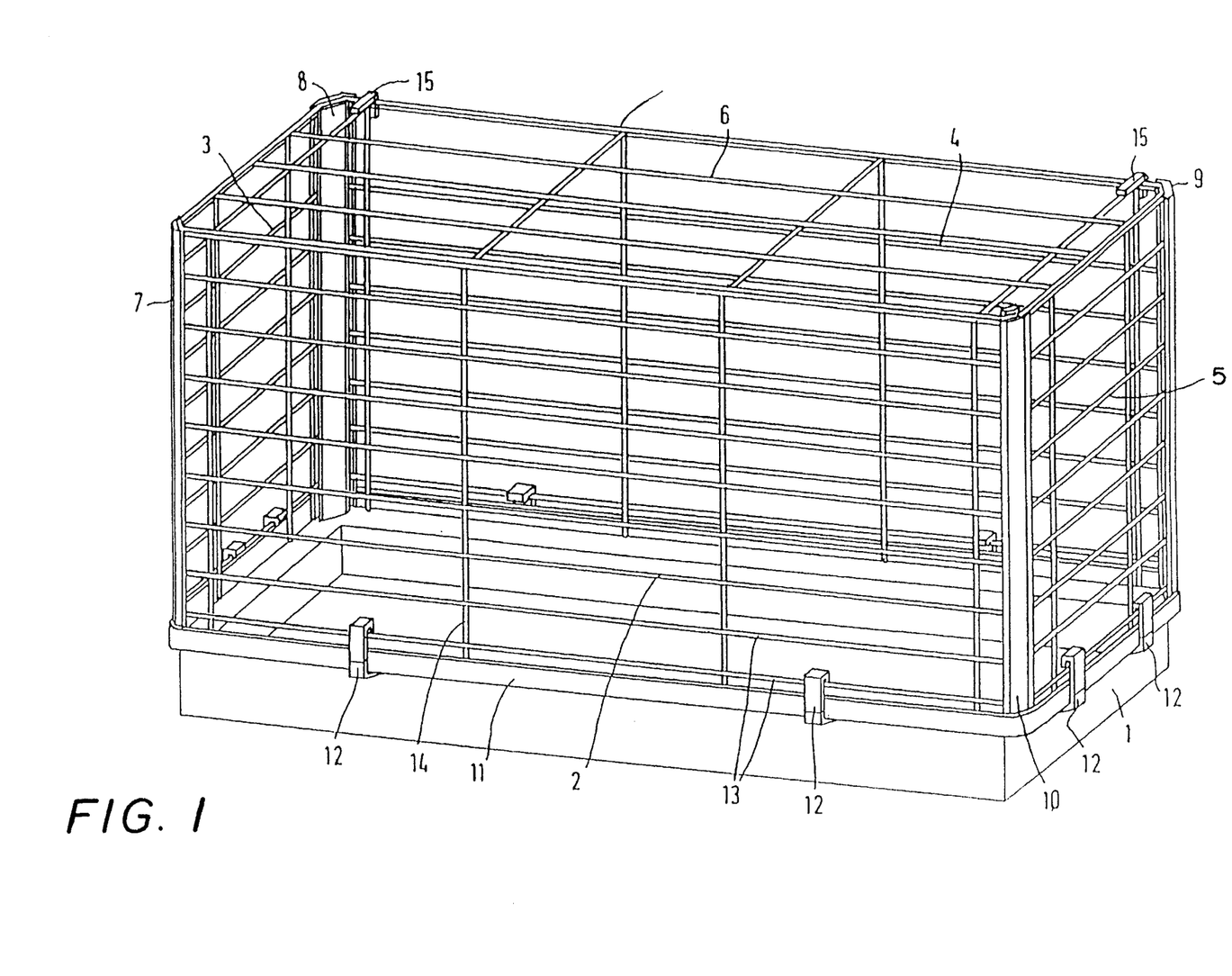
FIG. 1: A perspective view of the assembled cage.
Figure 2:
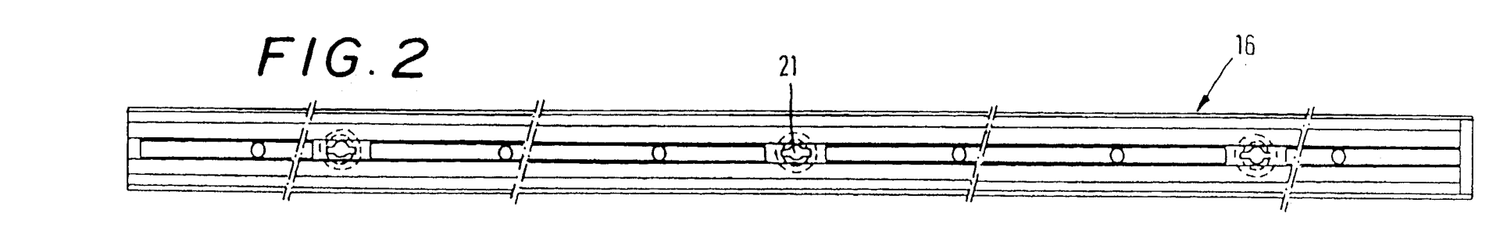
FIG. 2: A top view of the outer part of the sectional corner connector.
Figure 3:
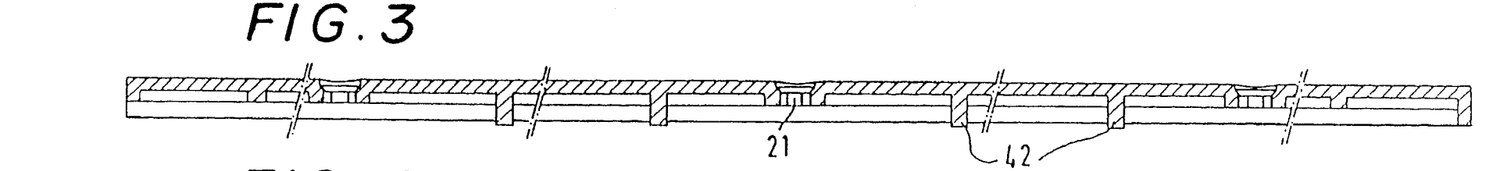
FIG. 3: A longitudinal section through the outer part of the sectional corner connector.
Figure 4:
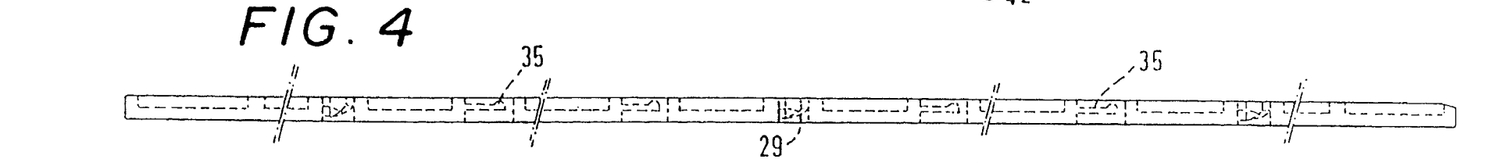
FIG. 4: A longitudinal section through the inner part of the sectional corner connector.
Figure 5:
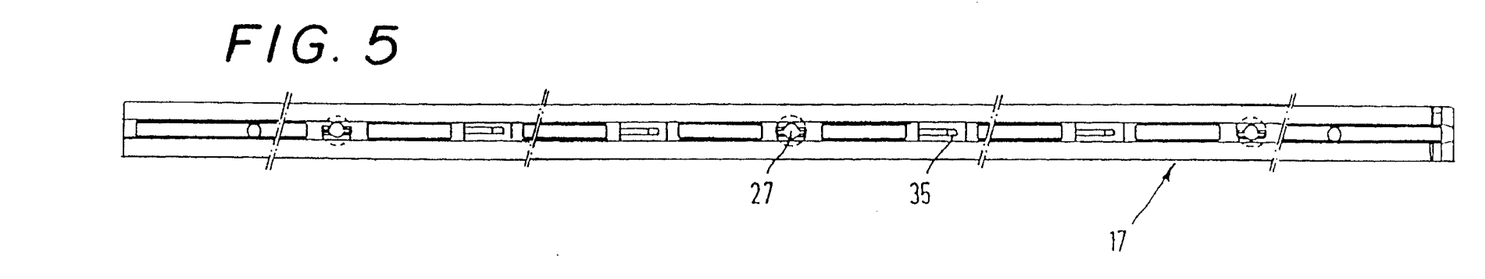
FIG. 5: A top view of the inner part of the sectional corner connector.
Figure 6:
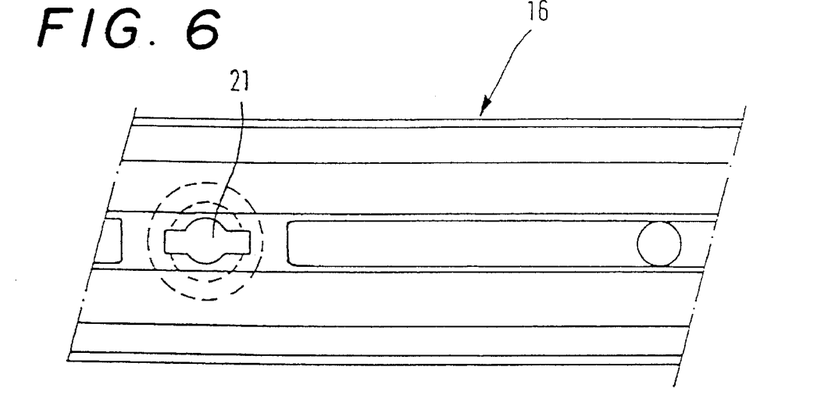
FIGS. 6 to 9: Larger-scale partial views of the parts shown in FIGS. 2 to 5.

The collapsible cage consists of a tray 1, four side walls 2 to 5 arranged at right angles to each other, a the lid 6. In each case, two adjacent side walls are joined together with each other via a sectional corner connector 7–10. In detail, the sectional corner connector 7 joins the left-hand lateral edge zone of side wall 2 together with the—seen in top view—right-hand lateral edge zone of side wall 3. The sectional corner connector 8 serves to join the associated edge zones of the side walls 3 and 4, and the sectional corner connector 9 joins the associated edge zones of side walls 4 and 5. Finally, the sectional corner connector 10 joins the edge zones of side walls 2 and 5.

The tray 1 is advantageously made of plastic and it may be provided with an outer circumferential edge 11 which accepts and supports the lower edge zone of the unit formed by the four side walls and the sectional corner connectors. Clip fasteners 12, which are not depicted in any further detail but are in any case of known design, provide a firm but detachable connection between this unit and the tray 1. The side walls of the tray are bent outwards at right angles so that the raised circumferential edge 11 is formed on which the unit can be supported and against which it can be drawn by means of the clip fasteners.

In the embodiments of the present invention, each side wall consists of a wire grating which may be manufactured in a known manner from horizontal bars 13 and vertical bars 14. The lid 6 may also consist of a wire grating. It is pivotably attached, in a manner not shown in detail, by means of hinges 15 to one of the four side walls, for example side wall 4; in this connection, the depiction in FIG. 1 is to be regarded as merely schematic. The "hinges" used may be simple closed hooks encircling the upper horizontal bar 13 of the wall 4. The lid may be joined to the other three side walls in a similarly known manner. This is not important with regard to the design, according to the present invention, of the unit consisting of four side walls and the four sectional corner connectors.

Each sectional corner connector 7 to 10 consists of an outer part 16 and an inner part 17. These may be drawn tightly together by means of several longitudinally arranged clamping devices 18, thereby holding between them the adjacent lateral edge zones 19 and 20 of the wire gratings (FIG. 10) of two side walls following each other in a circumferential direction; in this example it is the horizontal bars 13 which are gripped. As shown in the embodiment illustrated in FIG. 10, the vertical bars 14 at the outer edge of the grating do not necessarily also have to be clamped.

Figure 11:
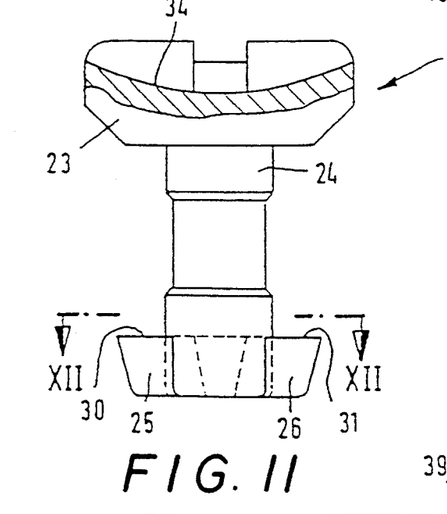
FIG. 11: A partially cutaway lateral view of the rotating part of the clamping device.
Figure 12:
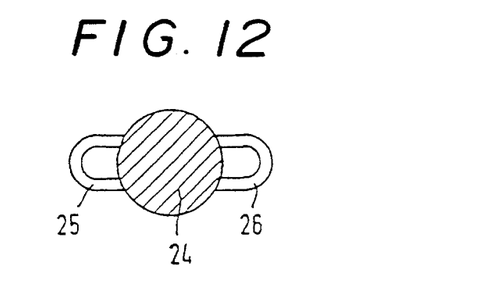
FIG. 12: A cross section through the line XII—XII shown in FIG. 11.

Outer part 16 of the sectional corner connector possesses several boreholes 21 for the rotating part 22 of the clamping device 18 (FIG. 11). The rotating part 22 consists essentially of a head 23 attached to a shaft 24, and also of at least one radially projecting cam attached to the free end of the shaft; in the embodiment according to FIGS. 11 and 12, two cams 25 and 26 are provided. For manufacturing related reasons, the center portion of the shaft may be slightly necked.

Figure 7:
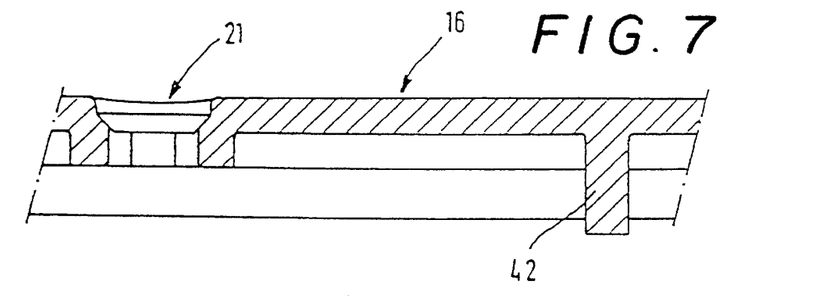

The lower section of the insertion borehole 21 (FIG. 7) has a keyhole-like cross section for a key having two webs pointing in opposite directions. The diameter of the circular part corresponds to the diameter of the shaft 24, while the dimensions of the radial slots opening into this borehole correspond to the largest dimensions of the cams 25 and 26, so that the lower end of the rotating part 22 can comfortably protrude from the lower part of the borehole 21. The upper part of the borehole 21 corresponds to a normal countersunk borehole and it accepts the correspondingly shaped head 23 (FIG. 11) of the rotating part 22.

Figure 9:
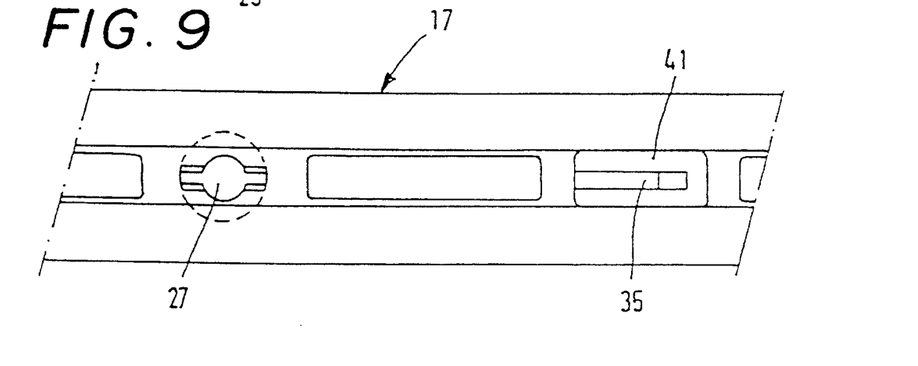
Figure 10:
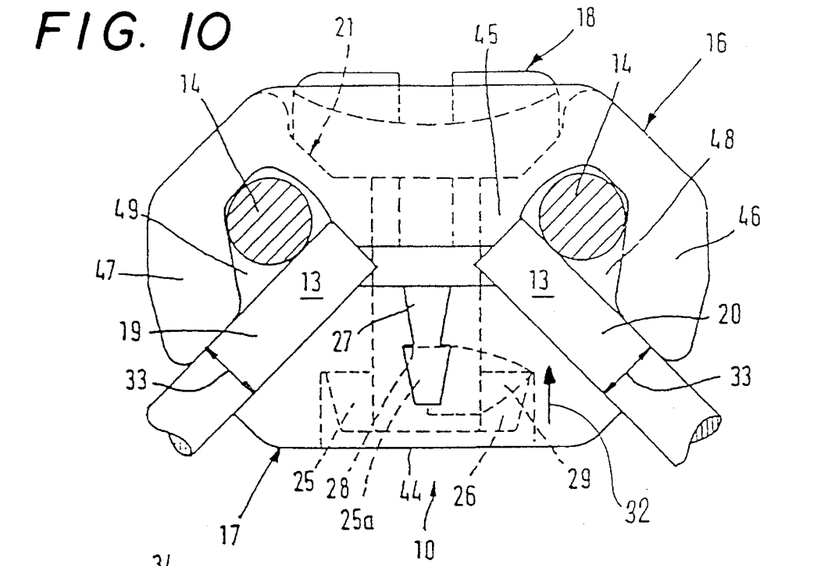
FIG. 10: An even larger-scale enlargement of a cross section through the sectional corner connector with clamped edge zones of adjacent side walls.

As per FIG. 10, the end of the rotating part 22 protruding at the bottom from borehole 21—possibly after first having been appropriately rotated—is inserted into a slot 27 in the inner part 17 of the sectional corner connector. Its shape corresponds substantially to the cross sectional shape of the lower section of borehole 21, and is evident from FIG. 9. It can be seen from FIG. 10 that the outer part of the slot 27 is tapered down and then widens suddenly into a shoulder section to form an undercut 28. The cross sectional shape of the outer part of the insertion slot 27 corresponds to the cross sectional shape of the rotating part 22 in the area of the cams 25 and 26. As soon as the cams are fully inserted into this outer part of slot 27, the rotating part 22 can only be further inserted by applying an appropriate amount of force, which requires the connector to yield and expand elastically, so that both cams 25 and 26 can pass through and engage behind the undercut 28. This can be accomplished by warming the inner part 17 of the sectional corner connector to a suitable temperature, and for this purpose one can make use of the heat generated in the manufacturing process. As soon as the rotating parts 22 have engaged in this manner, like a snap fastener, with the inner sectional corner connector 17, the two parts 16 and 17 of the sectional corner connector are undetachably held together by the rotating parts 22.

In each case the undercuts 28 merge into spiral ramp surfaces 29 (FIG. 10). If, after being inserted, the rotating part 22 is rotated in the intended direction, the contact faces 30 and 31 of the cams 25 and 26 slide along their associated spiral surface 29, thereby resulting in the inner part 17 of the sectional corner connector being drawn towards the outer part 16, in the direction indicated by the arrow 32 (FIG. 10). In the process, the gap 33 between the two parts 16 and 17 of the sectional corner connector is narrowed to such an extent from the maximum width which it attains when the sectional corner connectors 7 to 10 are untightened that preferably the horizontal bars 13 are tightly clamped. In FIG. 10 the two cams 25 and 26 are shown in their starting positions prior to tightening. The reference number 25a denotes the end position of rotation of cam 25, which reaches this position for example after rotating through 90°, given the thickness of the horizontal bars 13 which is evident in this Figure. Thinner horizontal bars would, of course, require a larger angle of rotation, while for thicker bars an angle of less than 90° would be sufficient to clamp the bars. The width of the gap 33 between the loose connectors 7 to 10 can be selected in such a manner that the side walls can be inserted into the connectors only in the longitudinal direction of the vertical bars 14. In this way, a reasonably stable structure, which cannot fall apart by itself, is obtained as soon as all the sectional corner connectors and the side walls are joined together, and this greatly simplifies assembly.

Furthermore, it can be seen for example from FIG. 11 that the head 23 of the rotating part 22 is provided with a slot 34, the shape of which permits a coin to be inserted, so that the rotating part can be rotated with the aid of this coin. The slot can be straight as shown in FIG. 11, or it can be a (Phillips type) cross slot.

Figure 13:
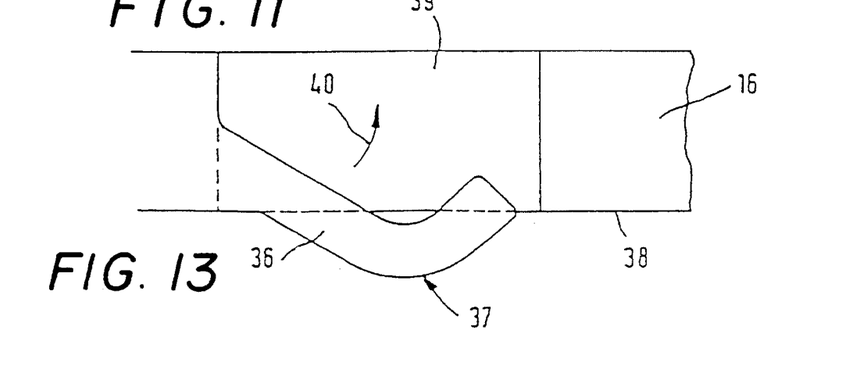
FIG. 13: An enlarged scale view of a second embodiment of the spreader spring.

Spreader springs 35 and 36 are provided in order to ensure that, after they have been joined by the clamping devices 18, the parts 16 and 17 of the sectional corner connectors are spaced as far apart as possible from each other so that the two lateral, longitudinal gaps 33 attain their maximum width, thereby simplifying the insertion of the edge zones 19 and 20 of the gratings. The spreader springs 35 are particularly clearly depicted in FIGS. 8 and 9. FIG. 13 illustrates another type of spreader spring, which is identified by the reference number 36. As described in more detail below, the spreader springs are designed and positioned in such a way that after the rotating parts 22 have latched into position, the springs are automatically tensioned and thus generate their spreading action.

In all cases, the springs take the form of pivotable tongue-shaped elements, In the embodiments described, they are integrally formed with their respective part of the sectional corner connector. In accordance with FIG. 13, the spreader springs 36 may be curved, with the back section 37 of the spring projecting above the plane of the connector 38. When it comes into contact with an opposing surface—in this case on part 17 of the sectional corner connector—the spreader spring 36 is pivoted in the direction indicated by the arrow 40 towards the interior of an appropriately dimensioned recess 39 in the part 16 of the sectional corner connector, and thus tensioned.

Figure 8:
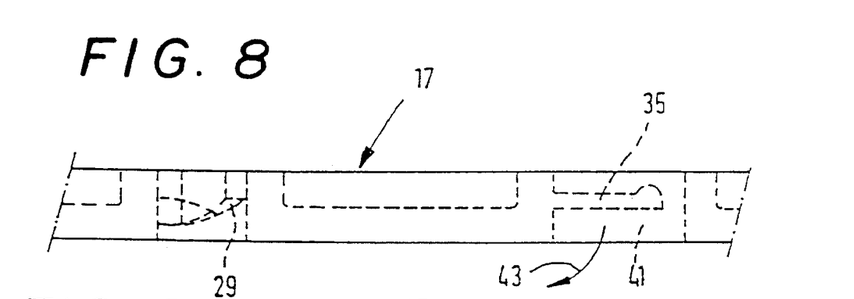

The spreader springs 35 shown in FIG. 8 are shown in their unloaded state, located totally inside their recess 41, which corresponds to the recess 39 in FIG. 13. In their untensioned state the springs are straight. When the rotating parts 22 are latched into position, the thickened, free end of each spring comes into contact with the free end of a spatially associated actuating pin 42 which projects into the recess 41 and causes the spring to bend in the direction of the arrow 43. In this case, the actuating pins 42 are located on the outer part 16 of the sectional corner connector. By undergoing bending the spreader springs 35 are tensioned and, as a result, they can force the two parts 16 and 17 of the sectional corner connector apart in the desired manner.

In accordance, for example, with FIG. 10 the inner part 17 of the sectional corner connector has a trapezoidal cross section, although the corners of the broad surface 44, which is situated on the outside when the connector is in use, may be rounded.

The outer part 16 of the sectional corner connector has a substantially C-shaped cross section. However, its middle section may be reinforced as shown in FIG. 10 and this reinforcement 45 may also be trapezoidal in cross section. The two smaller trapezoidal surfaces face each other and are equally large. Recesses 48 and 49 for the vertical bars 14 are formed between this reinforcement 45 and the two legs 46 and 47 of the C-shaped section.

In the embodiments described, all the side walls 2 to 5 consist of a grating which is made preferably of vertical and horizontal bars. Instead of this, the invention may be equally well utilized even if the walls are of a different design, provided just their edge zones are suitable to be inserted into and clamped in the gaps 33 of the sectional corner connectors.

In the embodiment illustrated in FIGS. 14 to 23 each clamping device 50 is combined with a spreader device to form an actuating unit 51. A two-part rotating element 52, consisting of a larger, essentially bolt-shaped part 53 (FIGS. 16 and 17) and a smaller essentially annular part 54 (FIGS. 18–20), is an essential element of this actuating unit. Both parts are joined together by a latching or snap-in engagement. Once they are joined, the outer part 16 of the sectional corner connector and the inner part 17 of the connector are undetachably held together by at least one but preferably by a plurality of actuating units 51. The rotating element, i.e. its larger, bolt-shaped part 53, possesses an outer end 55 of enlarged diameter and is provided with an actuating slot 56 of arcuate profile permitting the rotating element to be rotated with the aid of a coin.

Figure 14:
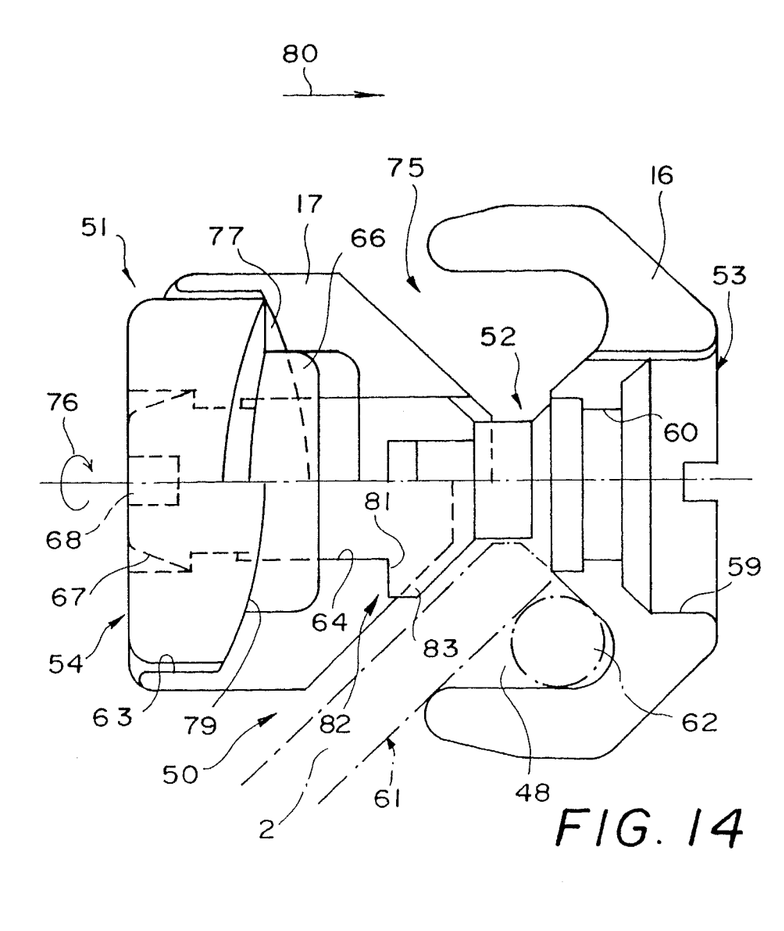
FIG. 14: A view, corresponding to FIG. 10, of a second variant of the spreader device.

Immediately behind the head 55 there is an undercut 57 followed by a conical section 58. As shown in FIG. 14, this area on the larger rotating element 53 can engage in snap-in fashion with the borehole 59 in the outer part 16 of the sectional corner connector; for this purpose, an internal collar 60 is formed onto the borehole 59 and this collar engages in the undercut 57. The latching engagement is facilitated by the conical section 58. The narrowed section 61 which follows after the conical section serves to accept the associated horizontal bar 61 of the grating forming the cage side wall 2. In analogy to FIG. 10, the associated vertical bar 62 of the respective end of the side wall is located in the recess 48 of the outer part 16 of the sectional corner connector. Normally, it is the horizontal bars 61 which are clamped. In the special case, i.e. when the horizontal bars are too thin, the vertical bar 62 can be clamped by itself or in addition to the horizontal bars. This applies to all the embodiments of the present invention.

Figure 21:
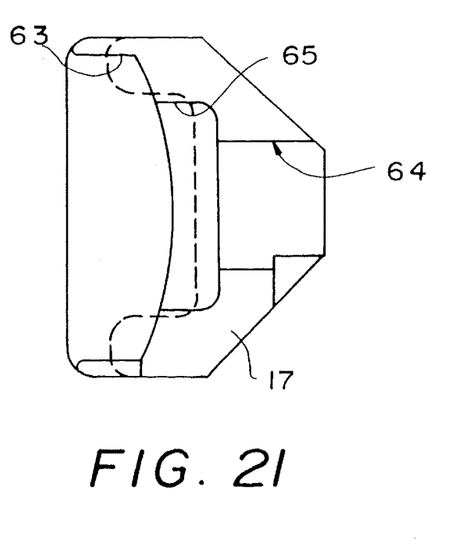
FIG. 21: A cross section perpendicular to the longitudinal axis through the inner part of the sectional corner connector as per FIG. 14.

In the same way that the thickened outer end 55 of the rotating element 52 is recessed in a widened part of the borehole 59 in the outer part 16 of the sectional corner connector, the smaller part 54 of the rotating element is also recessed in a widening of the borehole 63 in the inner part 17 of the profiled corner connector. The double-stepped, widened borehole in the inner part 17 of the sectional corner connector is indicated by the reference number 64 (FIG. 21). The pin-like projection 66 of the smaller part 54 of the rotating element fits into the inner expansion of the borehole 65.

Figure 16:
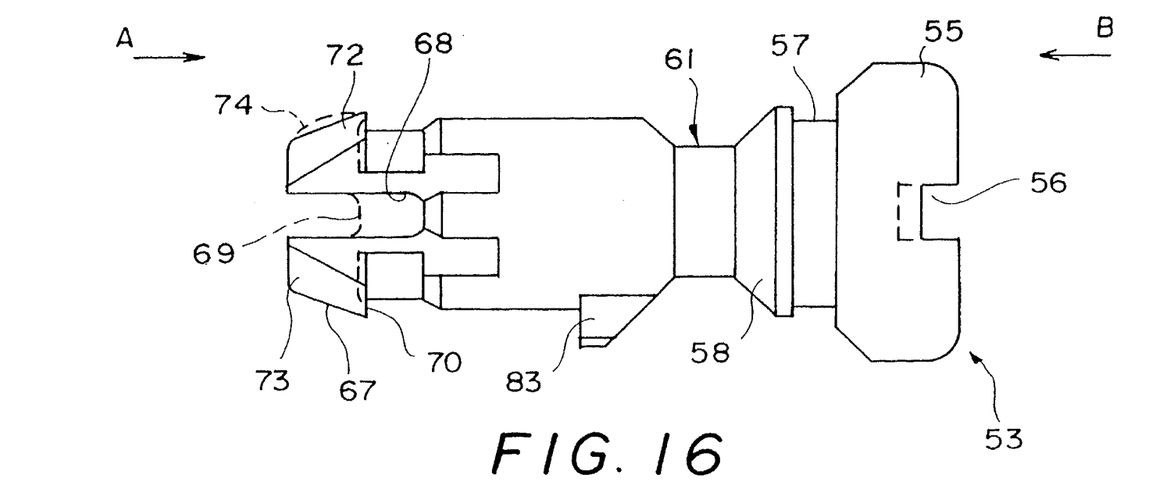
FIG. 16: A top view of the larger part of the two-piece rotating element.
Figure 17:
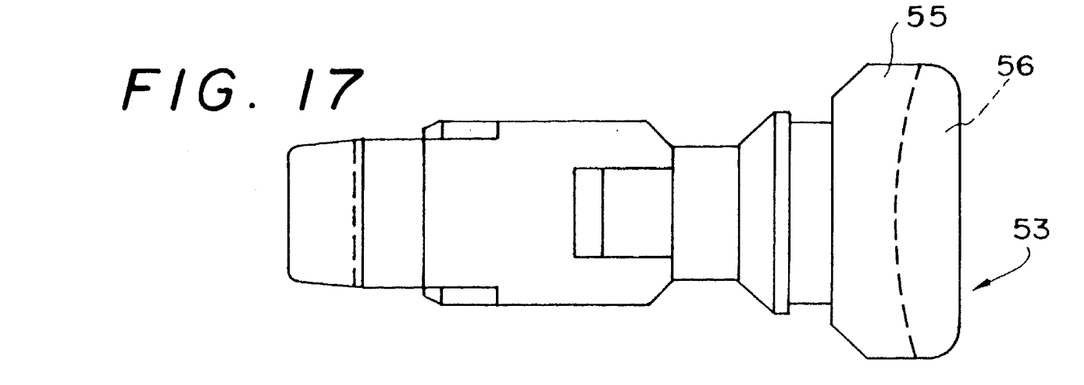
FIG. 17: A side view of the larger part of the rotating element.

The other end of the larger part 53 of the rotating element which lies opposite the outer end 55, is designed as a conical section 67 tapering towards the outside and it is provided with a longitudinal slot 68, i.e. it is forked. In FIG. 16 a short broken line 69 indicates that in order to achieve greater rigidity in this area, the longitudinal slot 68, drawn with an unbroken line in the Figure, may be made shorter than shown here. A shoulder 70 behind the conical section 67 engages, in accordance with FIG. 14, with an internal collar 71 on the smaller part 54 of the rotating element so that both are joined together in a non-rotatable and, in normal use, axially non-displaceable manner. When the latching engagement occurs, the two prongs 72 and 73 of the forked end move elastically at first towards each other and then apart again. The broken line 74 in FIG. 16 indicates a shorter, less slanted conical shape. If the cage is incorrectly assembled, the latching engagement can be unlatched in such a way that damage is avoided.

In FIG. 14, the upper half of the inner part 17 of the sectional corner connector is shown in the clamped position and the lower half of this inner part 17 is shown in the released position in which the side wall 2 to 5 can be inserted in a plane perpendicular to the plane of the drawing, for example from top to bottom, into the slot 75. Starting from the open position of the actuation unit 51, the two parts 16 and 17 of the sectional corner connector can be drawn together by rotating the rotating element 52 in the direction of rotation 76, for example with the aid of a coin, thereby clamping the respective edge zone of the inserted side walls 2 to 5. In the manner according to the present invention this is accomplished by means of a first twist-lift device 77 consisting of at least one circumferentially extending, axially projecting lifting cam at the bottom of the outer expansion of the borehole 63 in the inner part 17 of the sectional corner connector. Preferably two such lifting cams 78, offset by 180°, and with two "valleys" between them are provided. Furthermore, the first twist-lift device 77 includes a lifting countercam 79 on the face end of the smaller part 54 of the rotating element. According to FIG. 20, two such lifting countercams 79 offset by 180° are present. Again, between each of them there is a valley which can be very clearly seen in FIG. 20.

When the actuating unit 51 is opened, in each case one lifting countercam 79 engages in a valley between two lifting cams 78 on the inner part 17 of the sectional corner connector. The contacting surfaces can be clearly seen in the lower half of the drawing in FIG. 14. If, as has been stated, the rotating element 52 is rotated in the direction of the arrow 76, the lifting countercam 79 moves along the associated end surface at the bottom of the expanded borehole 63 until finally, after a rotation through an angle of 90°, each lifting countercam 79 comes to rest fairly precisely in front of a lifting cam 78. Assuming that the outer part 16 of the sectional corner connector shown in FIG. 14 is firmly held in place, this rotation of the rotating part causes the inner part 17 of the connector to move in the direction indicated by the arrow 80, thereby clamping the two adjacent end zones of adjacent side walls, e.g. side walls 3 and 4 (FIG. 1), which are preferably at right angles to each other. In this embodiment, a 90° angle of rotation is provided for tightening and releasing the parts of the connector, but other angles of rotation may also be selected.

In the area of each borehole 64 in the inner part 17 of the sectional corner connector, through which passes the rotating part 52, there is at least one spiral surface 81 (FIG. 23) of the second twist-lift device 82 (FIG. 14) situated on the surface of the inner part 17 of the sectional corner connector facing towards the outer part 16 of the sectional corner connector. The second twist-lift device 82 also includes a radially projecting sliding element 83 on the rotating element 52. In the embodiment shown, only one such sliding element is provided, but it is not a problem to form two sliding elements offset by 180° onto the rotating element 52, to each of which a spiral surface 81 is allocated.

Figure 22:
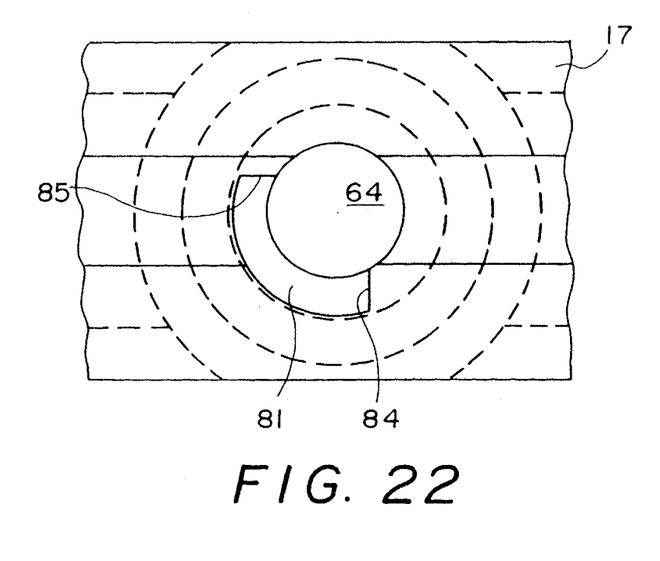
FIG. 22: A cutaway top view of the inner part of the sectional corner connector.
Figure 23:
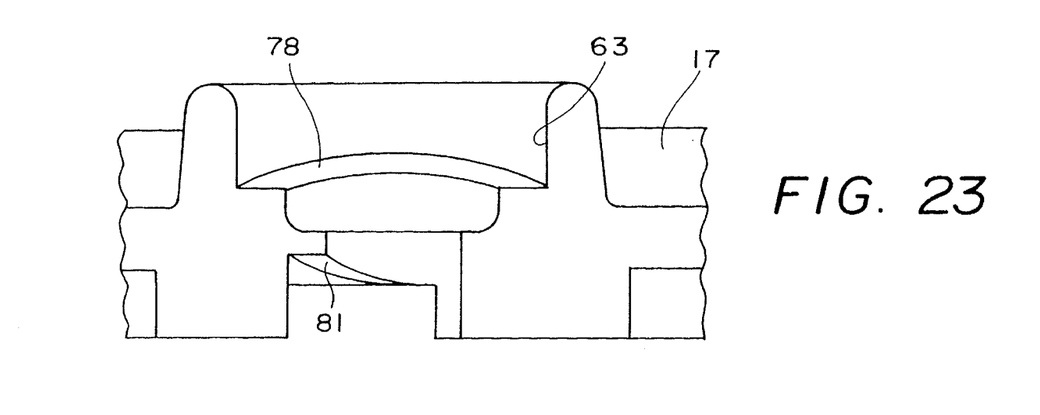
FIG. 23: A cutaway longitudinal section through the centre of the inner part of the sectional corner connector.

The first twist-lift device 77 and the second twist-lift device 82 are offset against each other in the direction of rotation in such a manner that when the clamping device 50 is operated, i.e. when the lifting cam 78 is positioned close up to the lifting countercam 79, the spreader device 81, 83 is in the non-operational position. This means that, seen in an axial direction, the sliding element 83 is at the lowest point of the spiral surface 81. This corresponds to the depiction in the upper half of FIG. 14. However, if the rotating element 52 is rotated in the opposite direction, i.e. counter to the direction indicated by the arrow 76, the sliding element 83 rides up the spiral surface 81 and in the process forces the inner part of the sectional corner connector against the direction indicated by the arrow 80—i.e. from right to left in FIG. 14—so that the slot 52 is widened. At the same time, the tips of the lifting cam and of the lifting countercam 79 which are in contact with each other move apart in synchronous phase with the movement on the spiral ramp. For the reasons mentioned, a 90° rotation is allowed for in each case. For this reason, as per FIG. 22, the spiral surface 21 also extends over a range of slightly more than 90° so that the middle of the sliding element 83 is in each case centrally aligned relative to the longitudinal or transverse axis when the rotation in either direction is completed. The rotational movement can advantageously be limited by providing two stop surfaces 84 and 85 at both ends of the spiral surface 81 (FIG. 22).

Figure 15:
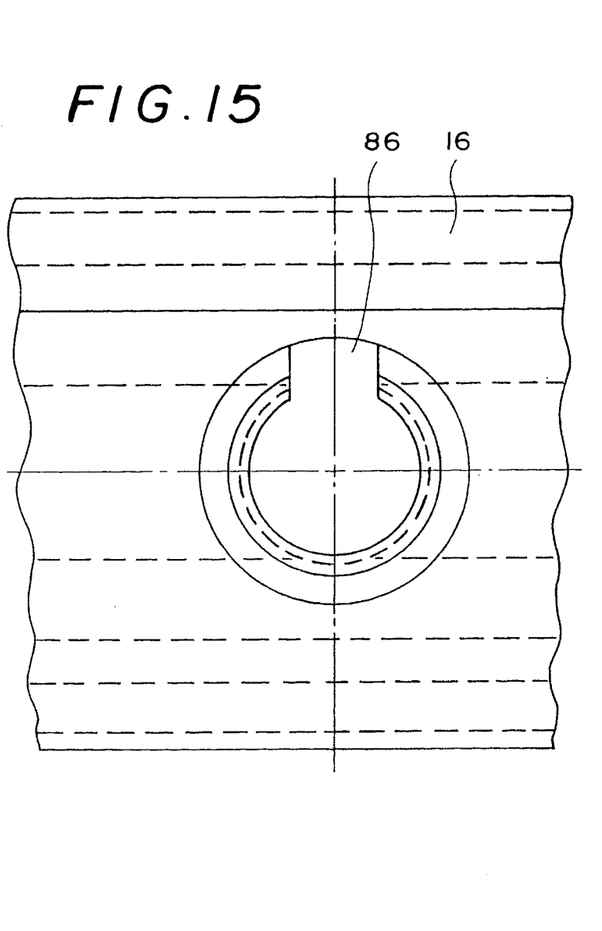
FIG. 15: A cutaway top view of the outer side of the sectional corner connector shown in FIG. 14.

In order to permit the sliding element 83 to pass through the borehole 60 in the outer part 16 of the sectional corner connector, a radial expansion slot 86 is provided as per FIG. 15. At this point it must once more be emphasized that, because of the engagement 57, 60, the rotating element 52 is mounted in the outer part 16 of the sectional corner connector in such a way that it is capable of rotation but cannot be axially displaced.

Figure 18:
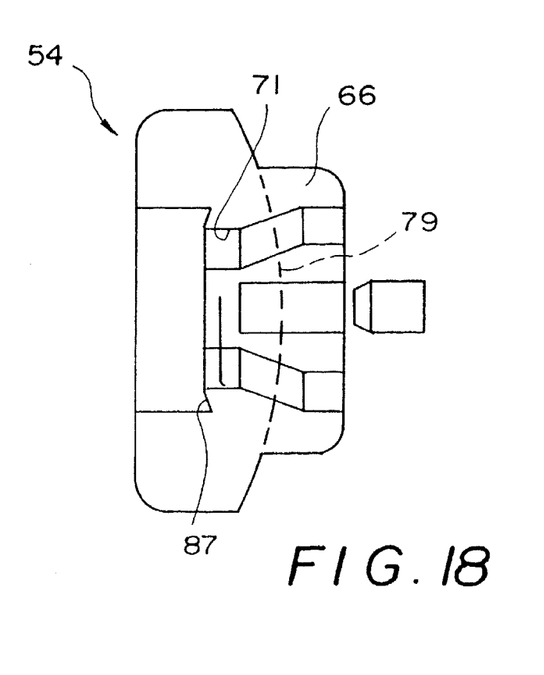
FIG. 18: A cross section through the smaller part of the two-piece rotating element.
Figure 19:
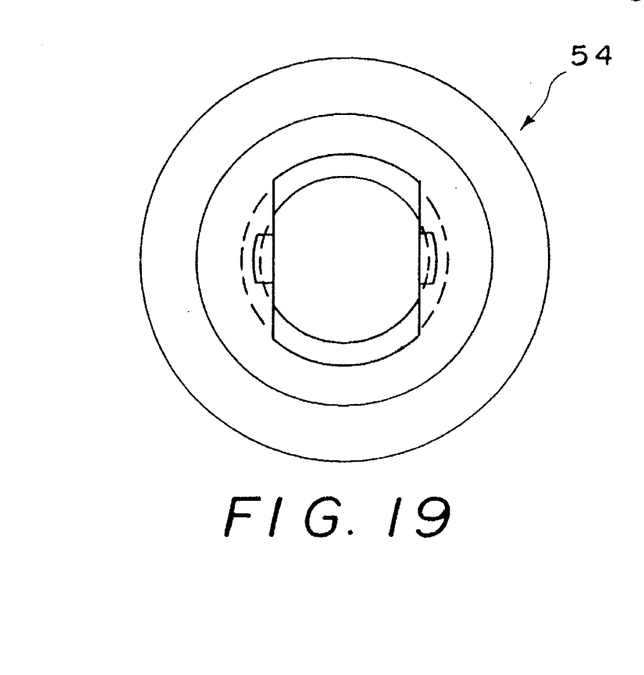
FIG. 19: A head-on view of the part shown in FIG. 18.
Figure 20:
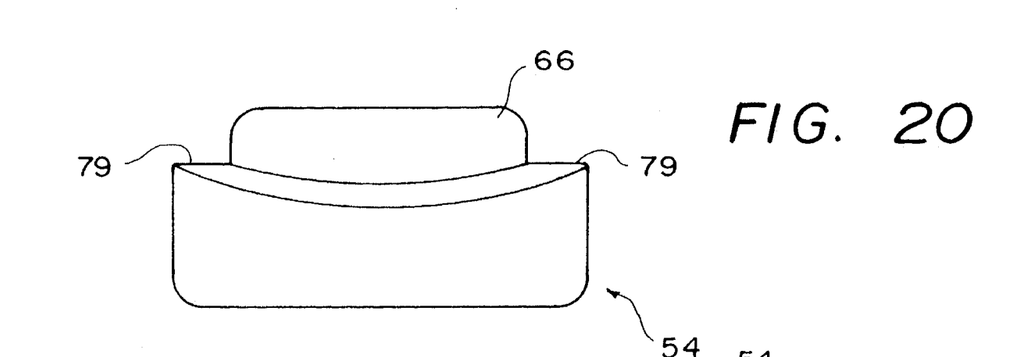
FIG. 20: A side view of the small part of the rotating element.

It remains to be added that the engagement surface for the shoulder 70 or the engagement edge of the larger part 53 of the rotating element is identified by reference number 87, as shown for example in FIG. 18.

I claim:

1. A collapsible cage, comprising:

a tray;

a plurality of side walls, said side walls being secured to said tray and arranged at right angles;

securing means for securing said plurality of side walls to said tray; and a plurality of sectional corner connectors, each separably joined to two edges of adjacent side walls, each said sectional corner connector comprising bars divided longitudinally into two parts, at least two clamping devices for tightly connecting the two parts together along with said edges of said adjacent side walls, and at least one spreader device which allows said two tightly connected parts to move apart relative to each other to a certain extent.

2. The collapsible cage as defined in claim 1, wherein said side walls are formed of wire grating.

3. The collapsible cage as defined in claim 1, further comprising:

a lid connected to said plurality of side walls.

4. The collapsible cage as defined in claim 2, wherein said lid is formed of wire grating.

5. The collapsible cage as defined in claim 1, wherein each said clamping device is releasably adjusted in order to insert said adjacent side walls between their associated bar parts.

6. The collapsible cage as defined in claim 1, wherein said at least one spreader device is formed as at least one spreader spring, and wherein the associated bar parts are pressed together by their clamping devices against the edges of said adjacent side walls and the resistance of said at least one spreader spring.

7. The collapsible cage as defined in claim 6, wherein said spreader springs are formed integrally with their associated bar parts, and as pivotable tongue-shaped elements.

8. The collapsible cage as defined in claim 7, wherein one of the parts of said bars defines a recess, and wherein said at least one spreader spring is curved with the back surface thereof projecting in the unloaded state beyond the edge of the part defining the recess and being elastically compressible into said recess.

9. The collapsible cage as defined in claim 8, wherein said at least one spreader spring is located in said recess, wherein the other of the parts of said bars defines an actuating pin, and wherein said actuating pin engages said at least one spreader spring when the parts of said bar are engaged.

10. The collapsible cage as defined in claim 1, wherein one of said bars has an approximately trapezoidal cross section and the other of said bars has a substantially C-shaped cross section.

11. The collapsible cage as defined in claim 10, wherein said other of said bars is internally reinforced, and wherein the cross section of said internal reinforcement is approximately trapezoidal.

12. The collapsible cage as defined in claim 1, wherein each clamping device comprises a rotating part having a shaft, a head and at least one radially-projecting cam at the free end of said shaft, wherein one of said parts defines a spiral-shaped ramp surface, and wherein said at least one radially projecting cam engages said spiral-shaped ramp surface.

13. The collapsible cage as defined in claim 12, wherein said shaft has a circular cross section and two radially projecting cams at its free end offset by 180°, said cams being tapered away from said head, and wherein one of said parts defines an insertion slot for said cams which is tapered similarly to said cams so that the cams engage said spiral-shaped ramp surface after passing through said insertion slot.

14. The collapsible cage as defined in claim 13, wherein one of said parts defines a support surface between said spiral-shaped ramp surface and said insertion slot, said spiral-shaped ramp surface merging gradually into said support surface.

15. The collapsible cage as defined in claim 12, wherein the other of said parts defines a recess into which said head fits at least partially.

16. The collapsible cage as defined in claim 12, wherein said cams are mounted inside said one of said parts.

17. The collapsible cage as defined in claim 12, wherein said head includes a slot engageable by means for rotating said rotating part.

18. The collapsible cage as defined in claim 1, wherein said tray defines a laterally projecting upper edge to which said side walls are secured by said securing means.

19. The collapsible cage as defined in claim 18, wherein said securing means comprise pivotable clips engaging both a respective side wall and said upper edge.

20. The collapsible cage as defined in claim 1, further comprising:

a lid, pivotably connected to one of said side walls.

21. The collapsible cage as defined in claim 20, wherein said lid is formed of wire grating.

22. A collapsible cage, comprising:

a tray;

a plurality of side walls, said side walls being secured to said tray and arranged at right angles;

securing means for securing said plurality of side walls to said tray;

a plurality of sectional corner connectors, each separably joined to two edges of adjacent side walls and each comprising bars divided longitudinally into two parts; and at least one actuating unit formed as a clamping device and a spreader device, said at least one actuating unit comprising a rotating element having a limited range of rotation, said rotating element passing transversely through both of said parts, with said rotating element being in a rotatable but axially non-displaceable manner with one of said parts, and two oppositely acting twist-lift devices situated such that when said rotating element is rotated in one direction said parts are drawn together by one of said twist-lift devices and when said rotating element is rotated in the opposite direction said parts are forced apart by the other of said twist-lift devices.

23. The collapsible cage as defined in claim 22, wherein one of said parts defines a borehole through which said rotating element passes, said borehole defining a lifting cam of one of said twist-lift devices, said lifting cam facing away from the other of said parts, and wherein said rotating element includes at least one lifting countercam engageable with said lifting cam, said parts being tightened together when the tip of said at least one lifting countercam engages the tip of said lifting cam.

24. The collapsible cage as defined in claim 23, wherein the lifting cams of said two twist-lift devices are offset by approximately 180° and are located on one of said parts, and wherein two lifting countercams are provided which are offset by approximately 180° and are located on said rotating element.

25. The collapsible cage as defined in claim 23, wherein the shape of the lifting cam corresponds substantially to the shape of the corresponding countercam, with each cam covering a range of approximately 90°.

26. The collapsible cage as defined in claim 22, wherein one of said parts defines a borehole through which said rotating element passes, said borehole defining at least one spiral surface of one of said twist-lift devices, said at least one spiral surface facing toward the other of said parts, and wherein said rotating element includes a radially projecting sliding element, said parts being spread apart when said at least one spiral surface engages said radially projecting sliding element.

27. The collapsible cage as defined in claim 26, wherein said spiral surface extends over an angular range of at least 90°.

28. The collapsible cage as defined in claim 26, wherein each end of said spiral surface includes a stop surface, and wherein said radially projecting sliding element serves as a stop to arrest rotational movement by engagement with said stop surfaces of said spiral surface.

29. The collapsible cage as defined in claim 22, wherein said rotating element has an outer end elastically engages one of said parts in the fashion of a snap fastener.

30. The collapsible cage as defined in claim 22, wherein said rotating element is formed as two parts, held together by a snap-type engagement.

31. The collapsible cage as defined in claim 30, wherein said rotating element is provided with two lifting countercams, and wherein at least one of said two lifting countercams is located on a smaller, annular part, of said rotating element.

32. The collapsible cage as defined in claim 31, wherein said rotating element includes a forked insertion end defining an engagement edge, wherein at least one lifting countercam is located on the inner side of said smaller, annular part of said rotating element, and wherein the outer side of said smaller, annular part of said rotating element includes a deep-engagement surface engaged by said engagement edge.

33. The collapsible cage as defined in claim 31, wherein one of said parts defines a borehole through which said rotating element passes, and wherein said smaller, annular part of said rotating element is partially recessed to form an enlargement of said borehole.

34. The collapsible cage as defined in claim 22, wherein the effective rotational setting of said two twist-lift devices is offset by approximately 90° relative to each other.

\* \* \* \* \*